United States Patent Office.

JOHN P. RIDER, OF BROOKLYN, NEW YORK.

Letters Patent No. 90,393, dated May 25, 1869.

---

IMPROVEMENT IN THE MANUFACTURE OF FLEXIBLE HOSE, TUBE, OR PIPE FOR CONVEYING FLUIDS UNDER PRESSURE.

---

The Schedule referred to in these Letters Patent and making part of the same.

---

*To whom it may concern:*

Be it known that I, JOHN P. RIDER, of Brooklyn, in the county of Kings, and State of New York, have invented certain new and useful Improvements in the Manufacture of Vulcanized Rubber or other Flexible Hose, Tube, or Pipe, used for Conveying Fluids under Pressure; and I hereby declare the following to be a full, clear, and exact description of the same.

In the use of flexible hose, composed of plies of cloth, canvas, or duck, with interposed rubber, and a coating upon the interior, or both interior and exterior, of rubber, the whole being vulcanized together in the manner well known to rubber-manufacturers, it has been found that any breakage or bursting of the hose almost invariably takes place at or near the couplings which unite the sections, or which hold the hose to machinery or other devices. This I have found to be owing to the fact that there is much more strain upon the hose at these points than at any other, for the reason that the interior diameter of the couplings is usually less, by about a quarter of an inch, than that of the hose which they couple; and therefore, as there is less water-way through the couplings than through the hose, there is necessarily a severe strain at the points of junction of the two.

To obviate this difficulty is the object of my invention, which consists in strengthening the hose by one or more extra plies of duck, cloth, or equivalent material, for the purpose, applied to the hose at the end which is united with the coupling, and extending back from the coupling, so as to reinforce, say about one foot, or more or less, as may be desirable, of the main part of the hose.

The hose, in other respects, is made in the usual manner, but at its ends I add one or more plies of duck or canvas, coated with rubber prepared for vulcanizing, and of such length as to reinforce or strengthen so much of the hose as desired. The plies are wrapped or folded around the exterior of the hose, and, after being covered by the coating of rubber which usually envelops the hose, the whole is vulcanized together in the usual manner.

By this simple means, I effectually remedy the difficulty above alluded to, and impart the necessary strength to the hose at the points where it is most required, and where, in fact, it is indispensable in order to produce an article capable of offering an equal resistance at all points to the pressure of the fluid within.

What I claim as my invention, and desire to secure by Letters Patent, is—

Reinforcing the ends of the vulcanized rubber hose to which the couplings are applied by means of one or more extra plies of cloth, duck, or equivalent material, coated with rubber, and applied to and united with the body of the hose, substantially in the manner herein set forth.

In testimony whereof, I have signed my name to this specification, before two subscribing witnesses.

New York, December 20, 1868.

JNO. P. RIDER.

Witnesses:
WILLIAM H. ACKEN,
JAMES R. BIRD.